US012544286B2

(12) United States Patent
Warwick et al.

(10) Patent No.: US 12,544,286 B2
(45) Date of Patent: Feb. 10, 2026

(54) COLLAPSIBLE SHELL MOUNTED PASSENGER LIFT ASSEMBLY

(71) Applicant: B/E Aerospace, Inc., Winston-Salem, NC (US)

(72) Inventors: Michael R. Warwick, Pleasant Garden, NC (US); Charles B. Cline, High Point, NC (US); Nicholas Coppola, Charlotte, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 393 days.

(21) Appl. No.: 18/215,387

(22) Filed: Jun. 28, 2023

(65) Prior Publication Data

US 2025/0000730 A1 Jan. 2, 2025

(51) Int. Cl.
*A61G 7/10* (2006.01)
*B64D 11/06* (2006.01)

(52) U.S. Cl.
CPC ............ *A61G 7/1001* (2013.01); *B64D 11/06* (2013.01)

(58) Field of Classification Search
CPC .................................................... A61G 7/1001
See application file for complete search history.

(56) References Cited

U.S. PATENT DOCUMENTS 4,003,479 A 1/1977 Reyer
4,360,307 A * 11/1982 Larsson ............... A61G 7/1053 212/73
6,637,610 B1 * 10/2003 Cheeseboro ......... A61G 7/1042 212/327
7,036,512 B2 * 5/2006 Harnois ................. A61G 5/128 601/24
10,555,855 B2 2/2020 Johnson et al.
11,241,350 B2 * 2/2022 Kaikenger ........... A61G 7/1017
11,786,430 B2 * 10/2023 Kaikenger ........... A61G 7/1065 5/83.1
2007/0294823 A1 12/2007 Hay
2009/0307840 A1 12/2009 Lingegard
(Continued)

FOREIGN PATENT DOCUMENTS

CA 2390260 A1 5/2000
CN 201394144 Y 2/2010
(Continued)

OTHER PUBLICATIONS

European Patent Office, Extended European Search Report received in EP Application No. 24183558.6, Oct. 28, 2024, 9 pages.

*Primary Examiner* — Jonathan Snelting
(74) *Attorney, Agent, or Firm* — Suiter Swantz IP

(57) ABSTRACT

A passenger lift assembly includes a spine defining a motion path, a lift mechanism attached to the spine and configured to travel along the motion path, and a plurality of branch subassemblies attached to the spine, each branch subassembly including at least one leg configured to engage an upstanding wall of a seat shell positioned in relation to a passenger seat. In use, the passenger lift assembly mounts to a seat shell positioned in relation to a seat to facilitate transfer of a passenger from the wheelchair to a seat, and collapses for compact stowing between uses. The passenger lift assembly is particularly well suited for use with seats surrounded by upstanding walls and curved pathways extending from an aisle to a passenger seat.

18 Claims, 6 Drawing Sheets

(56) References Cited

U.S. PATENT DOCUMENTS

| | | | |
|---|---|---|---|
| 2012/0286222 A1 | 11/2012 | Pattermann, Jr. et al. | |
| 2013/0111660 A1 | 5/2013 | Wilson | |
| 2015/0056050 A1* | 2/2015 | Decuir, Jr. ........... | A61G 7/1073 414/550 |

FOREIGN PATENT DOCUMENTS

| | | | |
|---|---|---|---|
| CN | 113893108 | B | 1/2022 |
| EP | 0027638 | A1 | 4/1981 |
| EP | 3205321 | A1 | 8/2017 |
| EP | 3919389 | A1 | 12/2021 |

* cited by examiner

COLLAPSIBLE SHELL MOUNTED PASSENGER LIFT ASSEMBLY

TECHNICAL FIELD AND BACKGROUND

The present disclosure relates generally to seat transfer solutions for persons with reduced mobility (PRM), and more particularly, to a passenger lift assembly configured to mount to a shell positioned in surrounding relation to a seat, wherein the passenger lift assembly is configured to collapse between uses of the assembly for compact stowage.

Persons with reduced mobility (PRM) require specialized ingress and egress solutions in aircraft considering narrow aisles and the requirement for all passengers to be seated in a certified seat. Current wheelchair-to-passenger seat transfers are performed manually by multiple crew members. Manual transfers increase the risk of injury to the passenger and crew and compromise the dignity of the PRM passenger.

Therefore, what is needed is a more dignified wheelchair-to-seat transfer solution that reduces crew count and risk of injury to the PRM passenger and the crew.

BRIEF SUMMARY

In one aspect, embodiments of the inventive concepts disclosed herein are directed to a passenger lift assembly. In embodiments, the assembly includes a spine defining a motion path, a lift mechanism configured to travel along the motion path defined by the spine, and a plurality of branch subassemblies attached to the spine, each branch subassembly including at least one leg configured to engage an upstanding wall of a seat shell positioned in surrounding relation to a passenger seat.

In some embodiments, the at least one leg is configured to removably attach to the upstanding wall via a latch and catch assembly, and the at least one leg includes one of a catch and a latch.

In some embodiments, each branch subassembly further includes a fixed segment attached to the spine, and the at least one leg is rotatably coupled to the fixed segment.

In some embodiments, the spine is elongated and curved.

In some embodiments, each leg is configured to rotate between a first position parallel to a plane of the spine and a second position perpendicular to the plane of the spine.

In some embodiments, the lift mechanism comprises a winch, a hook, a sling, and a plurality of rollers configured to roll along the spine.

In some embodiments, each of the spine, the fixed segments, and the legs are cylindrical tubes, and wherein the plurality of branch subassemblies are telescoping assemblies.

In some embodiments, the spine, the fixed segments, and the legs are made from aluminum.

In some embodiments, the spine includes a plurality of removably attachable spine segments.

In another aspect, embodiments of the inventive concepts disclosed herein are directed to a seat assembly including a shell positioned in surrounding relation to a seat, and a passenger lift assembly removably attachable to the shell. In embodiments, the passenger lift assembly includes a spine defining a motion path, a lift mechanism configured to travel along the motion path defined by the spine, and a plurality of branch subassemblies attached to the spine, each branch subassembly comprising at least one leg removably attachable to one of the upstanding walls.

In some embodiments, the shell includes spaced upstanding walls defining an interior space therebetween, and the plurality of branch subassemblies are configured to span the interior space to position the spine substantially centered over the interior space.

In some embodiments, the spaced upstanding walls are curved, the spine is curved, and a curvature of the spaced upstanding walls substantially matches a curvature of the spine.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
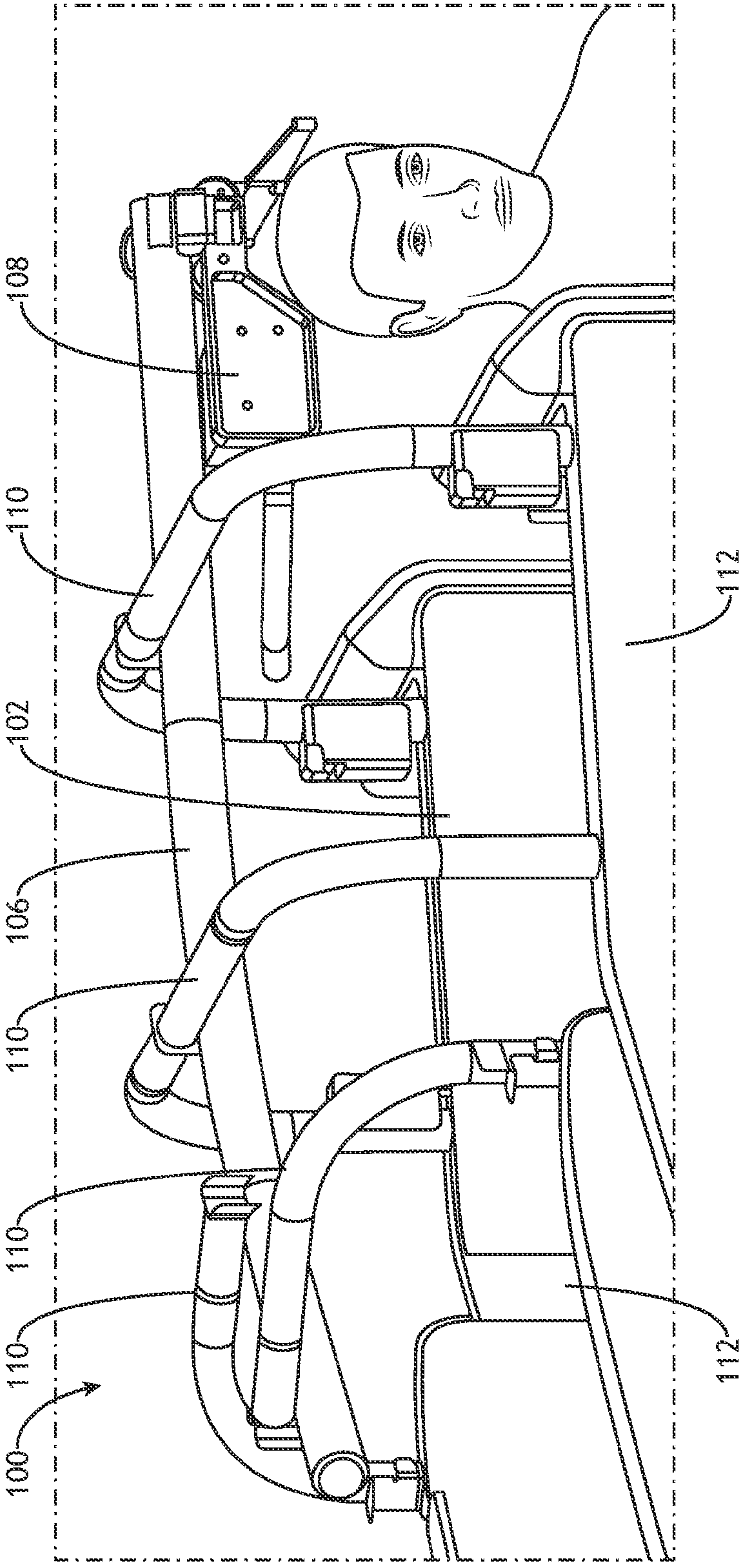
FIG. 1 is a perspective view of a passenger lift assembly shown mounted to a seat shell, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a passenger lift assembly for mounting to a shell positioned in surrounding relation to a seat, and a system including a seat shell and passenger lift assembly configured for removable attachment to the seat shell. In use in an airliner, the passenger lift assembly may be retrieved from stowage, manipulated to a deployed state, mounted to a seat shell, utilized to transfer a PRM passenger from a transfer wheelchair to their seat in the airliner, removed from the seat shell, manipulated to a collapsed state, and lastly stowed in a storage space in the airliner until a next use. The passenger lift assembly collapses to a compact package to facilitate stowing in an airliner where space is limited. In some embodiments, the passenger lift assembly is reconfigurable to correspond to different motion pathways extending from, for example, and aisle to a passenger seat positioned apart from the aisle.

Figure 2:
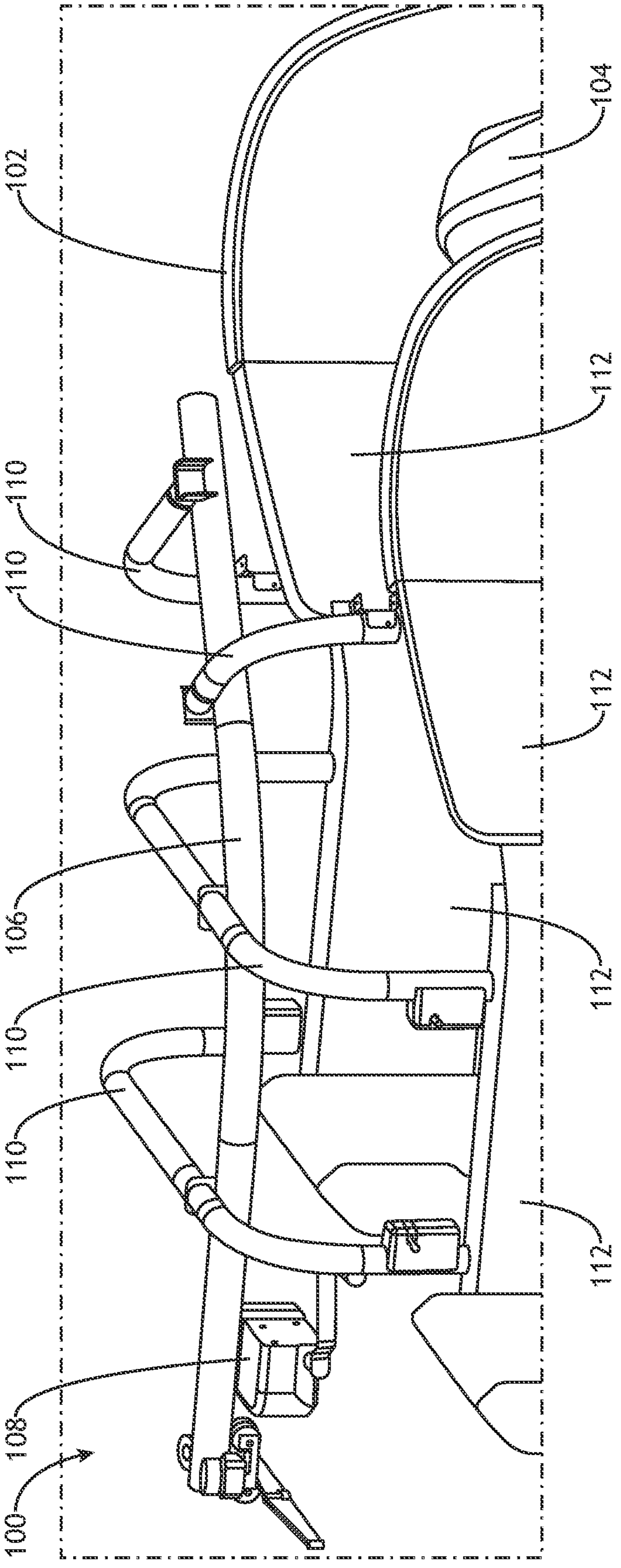
FIG. 2 is another perspective view of the passenger lift assembly shown mounted to the seat shell, in accordance with example embodiments of this disclosure.

FIGS. 1 and 2 illustrate the passenger lift assembly 100 shown removably attached to a seat shell 102 positioned in surrounding relation to a passenger seat (104 in FIG. 2). The passenger lift assembly 100, also referred to herein as "the assembly 100," generally includes a spine 106 defining a motion path, a lift mechanism 108 attached to the spine 106 and configured to travel along the motion path, and a plurality of branch subassemblies 110 attached to the spine and configured to mount to the seat shell 102 in order to position the spine 106 relative to the seat shell 102. As shown, the spine 106 is positioned suspended above and substantially centered between opposing walls of the seat shell 102.

The spine 106 defines a motion path from a first location apart from the seat 104, to a second location proximal to the seat 104. In some embodiments, the first location may be an aisle, the second location may be over the seat 104, and the motion path from the first location to the second location may be curved. In some embodiments, the seat may be a premium class seat (e.g., business, first, super first-class seat, etc.) surrounded by the seat shell 102, wherein the seat shell 102 includes a plurality of upstanding walls 112 defining an interior space. In embodiments, the upstanding walls 112 may be curved to define a non-linear pathway from the first location to the second location. The spine 106 may be elongated and curved, substantially matching the curvature of the non-linear pathway, to guide motion of the lift mechanism 108 along the curved pathway to the seat. In embodiments, the lift mechanism may provide 360 degrees of rotational motion such that the passenger can be lifted from the wheelchair, rotated to a position with their back facing the pathway and seat, and guided along the pathway until reaching their seat.

In embodiments, one end of the spine 106 may be positioned overhanging the aisle such that the lift mechanism can be positioned directly overhead a passenger seated in a wheelchair in the aisle, and the other end of the spine 106 may be positioned overhanging the passenger seat such that the lift mechanism 108 can be positioned directly above the passenger seat. In this configuration, the lift mechanism 108 can be operated to vertically raise the passenger out of the wheelchair, for instance a transfer wheelchair, and vertically lower the passenger into their respective passenger seat. The number of required branch subassemblies 110 may be determined by one or more of the strength capabilities of the assembly materials, distance between spaced upstanding walls 112, curvature of the travel pathway, length of the travel pathway, etc. As shown, the assembly 100 includes two branch subassemblies 110 that each interact with two opposing upstanding walls 112 considering the substantially transverse orientation of the branch subassemblies 110 to their respective walls 112, and two branch subassemblies 110 that interact with a single upstanding wall 112 considering their location along a curved portion of the upstanding wall 112. The number and types of branch subassemblies 110 may be customized depending on the particular upstanding wall 112 configuration.

Figure 3:
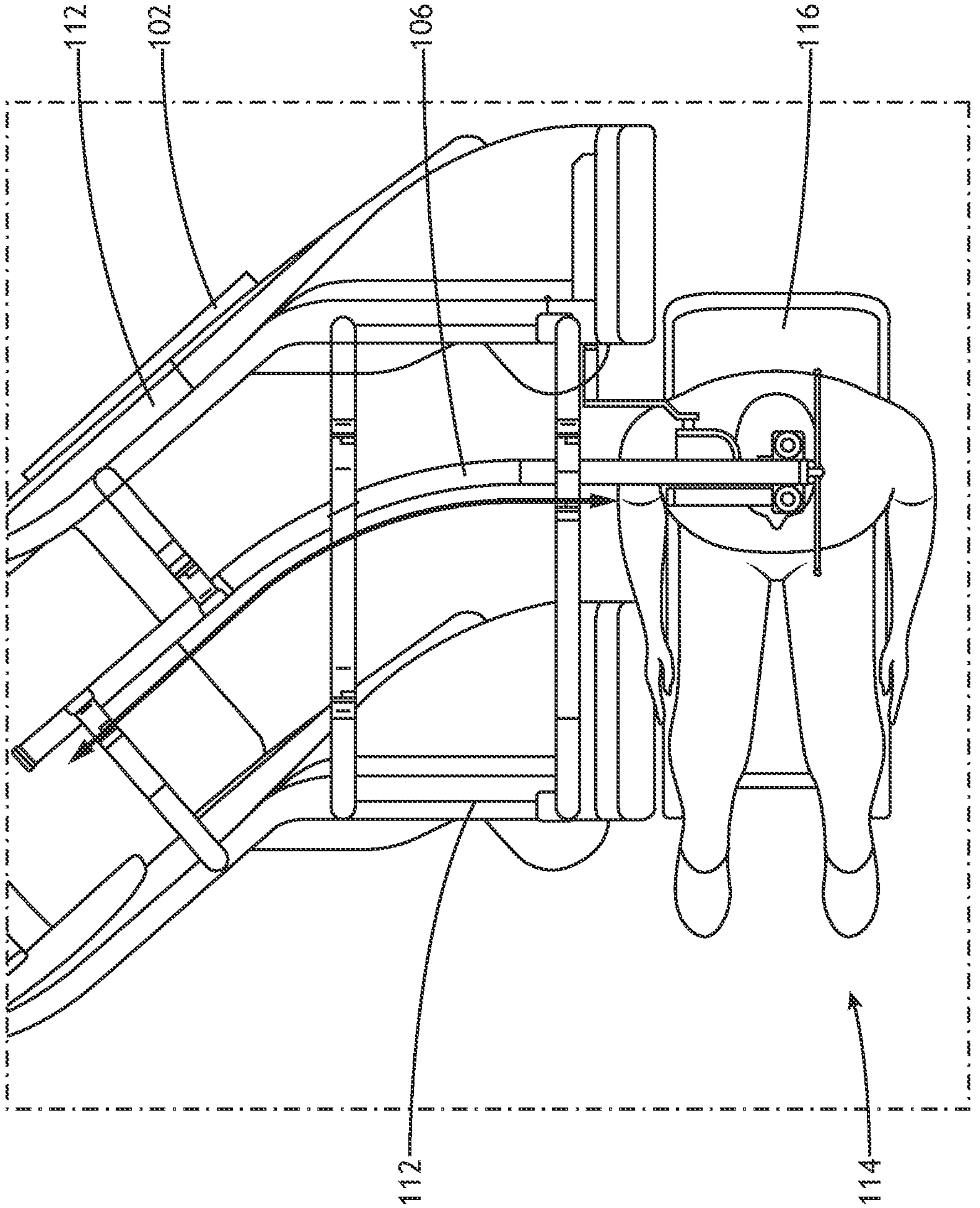
FIG. 3 is an overhead plan view of the passenger lift assembly shown mounted to the seat shell, in accordance with example embodiments of this disclosure.

FIG. 3 illustrates a non-limiting example of the upstanding walls 112 of the seat shell 102 defining a curved pathway from an aisle 114 to the seat 104 positioned a distance from the aisle 114. In some embodiments, the seating configuration may be a herringbone seating configuration in which the seat longitudinal axis is angled relative to the aircraft longitudinal axis. In this configuration, a transfer wheelchair 116 may be parked in the aisle 114 at the entrance to the seat 104 such that one end of the spine 106 is positioned overhead of the passenger and the opposing end of the spine 106 is positioned over the seat 104. The spine 106 may be shaped to substantially correspond to the shape of the pathway from the aisle entrance to the seat 104. In some embodiments, the spine 106 may be positioned substantially centered along the pathway from the aisle 114 to the seat 104 to minimize the opportunity for contact of the transferring passenger with any of the upstanding walls 112 during passenger transfer.

Figure 4:
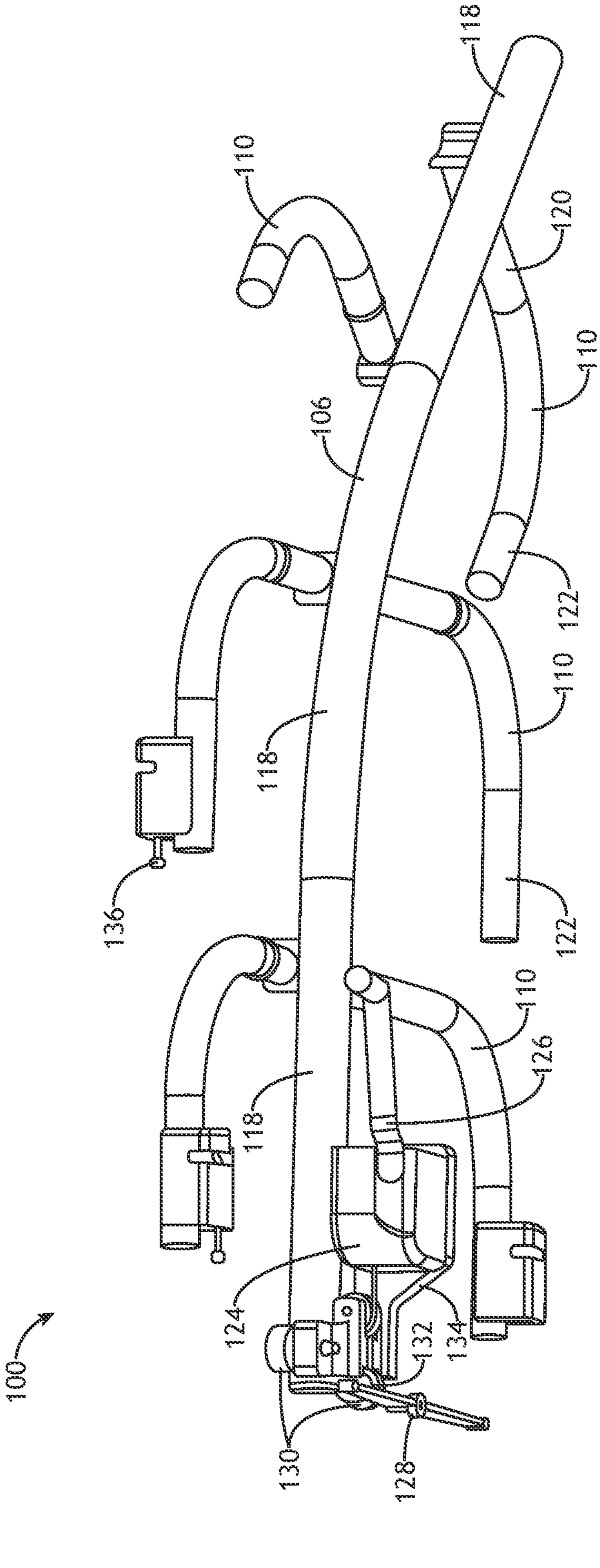
FIG. 4 is a perspective view showing the passenger lift assembly in a collapsed state, in accordance with example embodiments of this disclosure.

FIG. 4 illustrates an embodiment of the assembly 100. The spine 106 is elongated and extends from one end of the assembly 100 to an opposing end of the assembly 100. In some embodiments, the spine 106 is tubular and made from rigid and lightweight materials such as aluminum. The spine 106 may include a plurality of individual segments 118 configured to be taken apart for more compact stowage and/or to reconfigure the shape of the spine 106 to provide different shaped motion paths depending on the shape of the seat shell and length of the pathway to the seat. In some embodiments, the spine 106 may include telescoping segments for further adjustability and compact stowage.

In embodiments, each branch subassembly 110 generally includes a fixed segment 120 attached to the spine 106, and at least one leg 122 rotatably coupled to the fixed segment 120. The fixed segments 120 may be straight and may be rotatably and/or slidably coupled to the spine 106 for further adjustability. In some embodiments, the fixed segments 120 may be telescoping segments. Each leg 122 may be rotatably coupled to its respective fixed segment 120 such that legs 122 can be rotated between a first position in which the legs 122 are parallel to a plane defined by the spine 106 for compact stowage, and a second position in which the legs 122 are substantially perpendicular to the plane defined by the spine 106 to position the spine 106 at a predetermined height above the respective seat shell. As shown, all subassemblies attach along the same side of the spine 106, i.e., atop the spine 106, such that the lift mechanism 108 is able to travel along the length of the spine 106 without interference from any subassembly 110.

In embodiments, the lift mechanism 108 generally includes a winch 124, a hand crank 126, and a hook 128. Similar to a medical patient lift, the hook 128 is attachable to a sling (not shown) configured to be placed under or around the passenger to support the passenger during lifting. In use, the sling is positioned under or around the passenger, the sling is attached to the hook 128, and the manual crank 126 is turned to pay out or reel in a cable attached to the hook.

The lift mechanism 108 further includes a plurality of rollers 130 in contact with the spine 106 to facilitate smooth rolling motion of the lift mechanism 108 along the length of the spine 106. In some embodiments, the rollers 130 are part of a rolling carriage 132 supporting horizontally-oriented rollers positioned on diametrically opposed sides of the spine 106, and vertically oriented rollers positioned to engage the spine 106 on the spine side opposite the attachment side of the subassemblies 110. The carriage 132 may include a bracket 134 for attaching the winch 124. In embodiments, the lift mechanism 108 travels as a single unit along the length of the spine 106 to position the hook 128 over the transfer wheelchair and the passenger seat such that the hand crank 126 can be used at each location.

In embodiments, some of the legs 122 may sit atop their respective upstanding wall without a locking attachment, whereas other legs 122 may lockingly engage their respecting upstanding wall. Locking engagement may be provided by a latch and catch assembly wherein the leg 122 carries one of the latch and catch and the upstanding wall carries the other of the latch and catch. As shown, some of the legs 122 may carry a latch implemented as a post 136 configured to be received in a catch implemented as an opening formed in the respective upstanding wall. In some embodiments the latch, after being inserted into the catch, may be manipulated to lock the components together. In such an embodiment, releasing the latch from the catch may require manipulating the latch in a direction opposite the locking direction.

Figure 5:
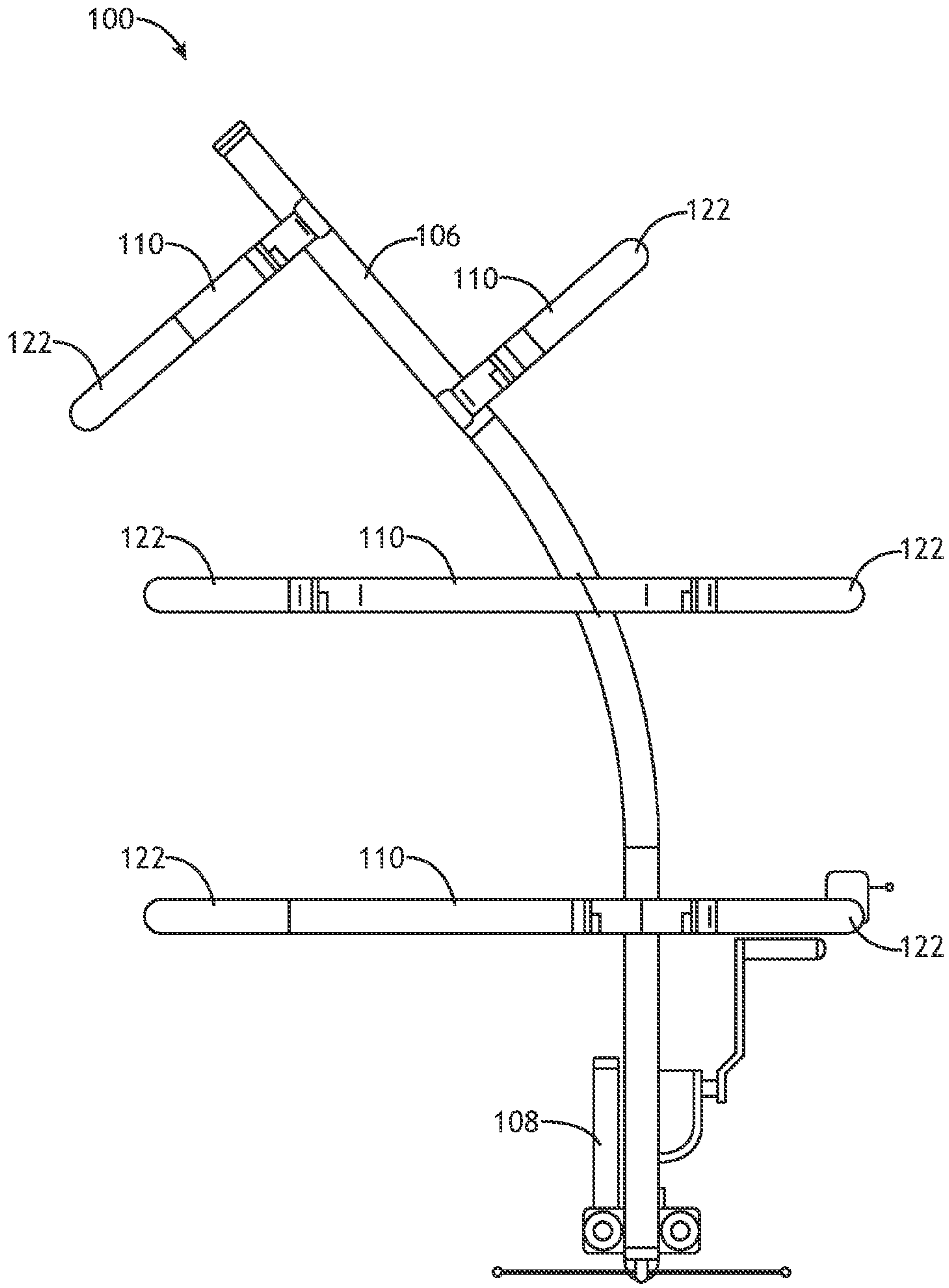
FIG. 5 is a top view showing the passenger lift assembly in a deployed state, in accordance with example embodiments of this disclosure.
Figure 6:
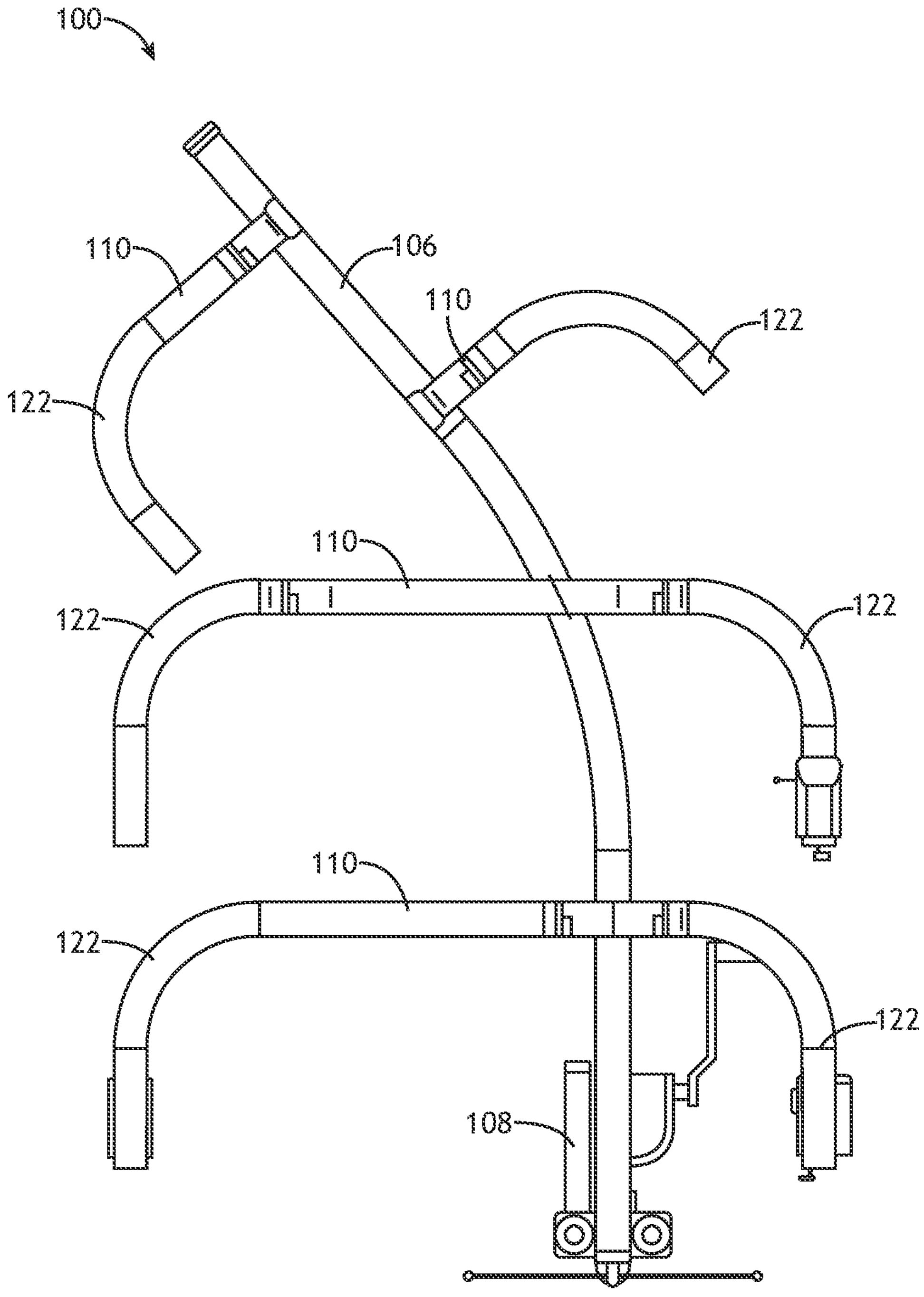
FIG. 6 is a top view showing the passenger lift assembly in a collapsed state, in accordance with example embodiments of this disclosure.

FIGS. 5 and 6 illustrate the respective expanded and collapsed configurations of the assembly 100. FIG. 5 illustrates each of the legs 122 rotated to their position perpendicular to the plane of the spine 106 for use of the assembly 100. FIG. 6 illustrates each of the legs 122 rotated to a position substantially parallel to the plane of the spine 106 for stowing the assembly 100. At least one of the legs includes a latch, for instance implemented as a post 136, for locking the leg 122 to its respective upstanding wall.

The assembly 100 includes a number of branch subassemblies 110, for instance 2, 3, 4, 5 . . . n, which are spaced apart along the length of the spine 106 to provide stable and adequate support for the weight of the transferring passenger. Considering a transfer wheelchair parked in the aisle adjacent the suite entrance, and the seat shell ending at the aisle, one end of the spine 106 may be cantilevered to be positioned in the aisle and above the wheelchair. A first branch subassembly 110 may be positioned inward from the cantilevered end of the spine 106 and successive branch subassemblies 110 spaced apart to the opposing end of the spine. Some branch subassemblies 110, and in particular the fixed segments, may be oriented perpendicular to the spine 106 at their point of attachment whereas other fixed segments may be oriented at a different angle depending on the curvature of the spine and upstanding walls.

Some branch subassemblies 110 may include a single leg configuration whereas other branch assemblies may include a double leg configuration, depending on the need for more than one leg and interference with another branch subassembly 110. Although not shown, the spine 106 may include a mechanical stop at each end for defining the total length of the motion path and preventing the lift mechanism 108 from leaving the spine 106. As stated above, each of the spine 106 and the branch subassemblies 110 may be constructed from segments so that the assembly 100 can be taken apart for stowing or reconfigurability to accommodate a different length and/or shaped motion path or seat shell configuration.

In a non-limiting application, a passenger cabin may be configured with a number of repeating suites defined by spaced upstanding walls, for instance in a herringbone configuration or reverse herringbone configuration in which the seat within each suite is angled relative to the aircraft longitudinal axis. To enhance privacy, the upstanding walls may be linear proximal to the seat and curve as they approach the aisle, thus providing a non-linear pathway from the aircraft longitudinal aisle the passenger seat. The passenger cabin may be equipped with a lift assembly 100 according to the present disclosure that corresponds in pathway shape and length to the pathway from each seat to the aisle. Certain ones or all of the suites in the cabin, for instance certain suites along one side of the longitudinal aircraft aisle, may be compatible for use with the lift assembly 100. When needed, the lift assembly 100 may be retrieved from a stowage compartment, manipulated to its use configuration, installed atop the respective upstanding walls, and used to transfer a PRM from the aisle to their seat. After transfer is complete, the lift assembly 100 is removed from the upstanding walls, manipulated to is stowed configuration, and returned to its designated stowage space.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A passenger lift assembly, comprising:

a spine defining a motion path;

a lift mechanism attached to the spine and configured to travel along the motion path; and a plurality of branch subassemblies attached to the spine, each branch subassembly comprising at least one leg configured to engage an upstanding wall of a seat shell positioned in relation to a passenger seat;

wherein the at least one leg is configured to removably attach to the upstanding wall via a latch and catch assembly, and the at least one leg comprises one of a catch and a latch.

2. The passenger lift assembly according to claim 1, wherein:

each branch subassembly further comprises a fixed segment attached to the spine; and the at least one leg is rotatably coupled to the fixed segment.

3. The passenger lift assembly according to claim 2, wherein each of the spine, the fixed segments, and the legs are cylindrical tubes, and wherein the plurality of branch subassemblies are telescoping assemblies.

4. The passenger lift assembly according to claim 2, wherein the spine, the fixed segments, and the legs are aluminum.

5. The passenger lift assembly according to claim 1, wherein the spine is elongated and curved.

6. The passenger lift assembly according to claim 1, wherein each leg is configured to rotate between a first position parallel to a plane of the spine and a second position perpendicular to the plane of the spine.

7. The passenger lift assembly according to claim 1, wherein the lift mechanism comprises a winch, a hook, a manual crank, and a plurality of rollers configured to roll along the spine.

8. The passenger lift assembly according to claim 1, wherein the spine comprises a plurality of removably attachable spine segments.

9. A seat assembly, comprising:

a seat shell including upstanding walls positioned in relation to a seat; and a passenger lift assembly removably attachable to the seat shell, the passenger lift assembly comprising:

a spine defining a motion path;

a lift mechanism attached to the spine and configured to travel along the motion path; and a plurality of branch subassemblies attached to the spine, each branch subassembly comprising at least one leg removably attachable to one of the upstanding walls;

wherein each leg attaches to its respective upstanding wall via a latch and catch assembly.

10. The seat assembly according to claim 9, wherein:

each branch subassembly further comprises a fixed segment attached to the spine; and the at least one leg is rotatably coupled to the fixed segment.

11. The seat assembly according to claim 9, wherein the spine is elongated and curved.

12. The seat assembly according to claim 9, wherein each leg is configured to rotate between a first position parallel to a plane of the spine and a second position perpendicular to the plane of the spine.

13. The seat assembly according to claim 9, wherein the lift mechanism comprises a winch, a hook, a sling, and a plurality of rollers configured to roll along the spine.

14. The seat assembly according to claim 9, wherein:

the shell comprises spaced upstanding walls defining an interior space therebetween; and the plurality of branch subassemblies are configured to span the interior space to position the spine substantially centered over the interior space.

15. The seat assembly according to claim 14, wherein the spaced upstanding walls are curved, the spine is curved, and a curvature of the spaced upstanding walls substantially matches a curvature of the spine.

16. The seat assembly according to claim 9, wherein the spine comprises a plurality of removably attachable spine segments.

17. A seat assembly, comprising:

a seat shell including upstanding walls positioned in relation to a seat; and a passenger lift assembly removably attachable to the seat shell, the passenger lift assembly comprising:

a spine defining a motion path;

a lift mechanism attached to the spine and configured to travel along the motion path; and a plurality of branch subassemblies attached to the spine, each branch subassembly comprising at least one leg removably attachable to one of the upstanding walls;

wherein:

the shell comprises spaced upstanding walls defining an interior space therebetween;

the plurality of branch subassemblies are configured to span the interior space to position the spine substantially centered over the interior space; and the spaced upstanding walls are curved, the spine is curved, and a curvature of the spaced upstanding walls substantially matches a curvature of the spine.

18. The seat assembly according to claim 17, wherein each leg is configured to rotate between a first position parallel to a plane of the spine and a second position perpendicular to the plane of the spine.

* * * * *